United States Patent [19]

Råström

[11] 4,329,847
[45] May 18, 1982

[54] BACK PRESSURE TURBINE FOR A DISTRICT HEATING PLANT HAVING A CUT-OFF VALVE BETWEEN THE TURBINE AND THE CONDENSER

[75] Inventor: Arne Råström, Finspong, Sweden

[73] Assignee: Stal-Laval Turbin AB, Sweden

[21] Appl. No.: 141,732

[22] Filed: Apr. 18, 1980

[30] Foreign Application Priority Data

Apr. 23, 1979 [SE] Sweden ............................. 7903521

[51] Int. Cl.³ ............................................ F01K 17/02
[52] U.S. Cl. ...................................... 60/648; 60/692; 237/12.1
[58] Field of Search ............... 237/12.1, 13.8; 60/690, 60/692, 693, 648

[56] References Cited

U.S. PATENT DOCUMENTS 1,376,326  4/1921  Evans .................................. 237/12.1
2,893,926  7/1959  Worthen et al. ................. 60/648 X
4,170,879  10/1979  Laing et al. ........................... 60/648

Primary Examiner—Allen M. Ostrager
Attorney, Agent, or Firm—Pollock, Vande Sande & Priddy

[57] ABSTRACT

The invention relates to a back pressure turbine (2) for a district heating plant (15), in which a cut-off valve (22) is provided between the turbine (2) and the condenser (5). The valve makes it possible to use the turbine condenser for heating the water of the district heating system through direct supply of steam from the steam boiler (1) when the turbine is shut off.

8 Claims, 4 Drawing Figures

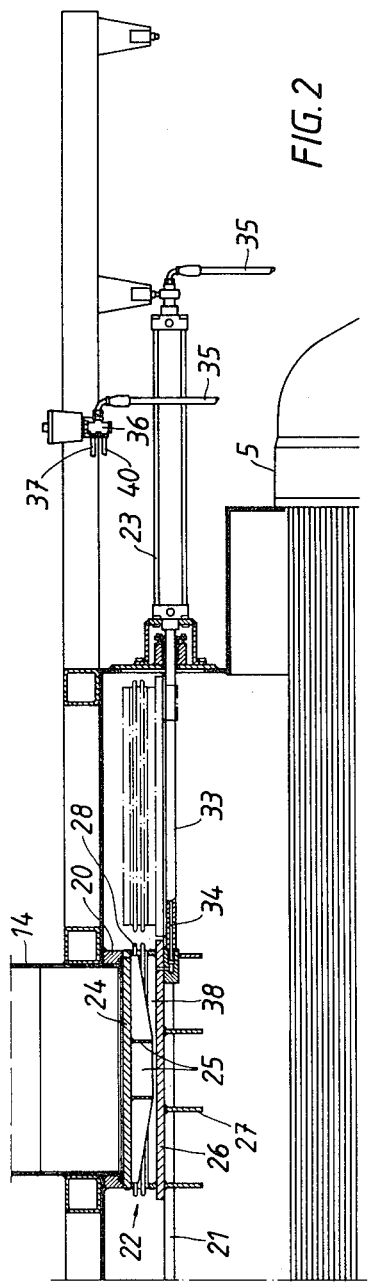
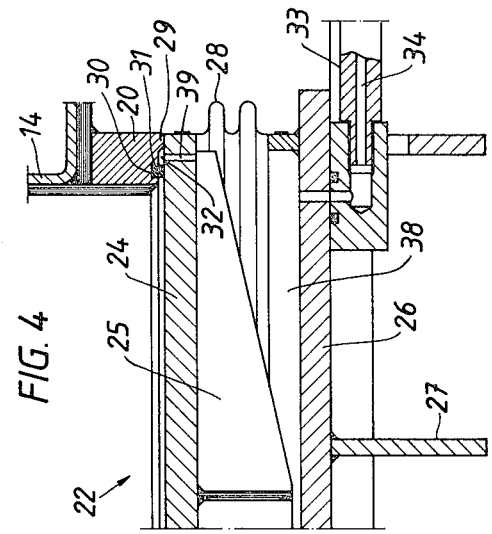
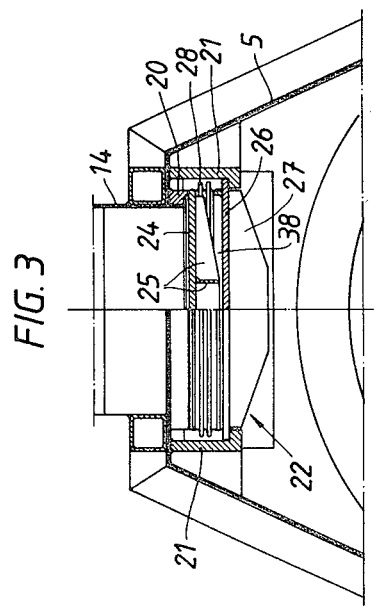

BACK PRESSURE TURBINE FOR A DISTRICT HEATING PLANT HAVING A CUT-OFF VALVE BETWEEN THE TURBINE AND THE CONDENSER

TECHNICAL FIELD

The present invention relates in general to turbine generator systems in which the turbine condenser is used to heat auxiliary water, such as for heating houses. More particularly, the invention concerns a back pressure turbine for a district heating plant in which a cut-off valve is installed between the turbine and its condenser so heating water may continue when the turbine is not operating.

DISCLOSURE OF THE INVENTION

The purpose of the invention is to provide a cut-off device which, in normal operation, does not cause any drop of pressure between the turbine and the condenser and losses resulting therefrom; and, in the case of an inoperative turbine, separates the turbine from the condenser. Thus, it is possible during a shutdown period of the turbine to continue to heat hot water in the condenser by supplying steam directly from the steam boiler. Therefore, it is possible to carry out revision work on the turbine or the generator. Moreover, a separate condenser is no longer required for heating the water of the district heating system during shutdown of the turbine.

According to the invention, a valve is arranged inside the condenser with a valve member capable of closing the inlet opening to the condenser. The inlet opening is surrounded by a valve seat with which the valve member cooperates when the turbine is to be isolated from the condenser. The valve member is suitably displaceable along guides inside the condenser between a first position to one side of the inlet opening and a second position right in front of the inlet opening.

The valve member comprises a valve disc and a lifting device capable of pressing the valve disc against the valve seat. The valve member may be connected to a bellows and, via this bellows, to a bottom plate. Between the valve disc, the bellows and the bottom plate there is then formed a closed space. This space communicates through conduits and operating valves with a source of fluid pressure so that the space may be supplied with a fluid, typically water, which causes the valve disc to be pressed against the valve seat. The valve seat and the valve disc are suitably constructed such that an annular space is formed between these units. When the valve is closed, this annular space communicates through conduits and valves with a source of pressurized water so that is may be supplied with sealing water. The valve disc is suitably operated by pressurized water from the condensate pump, and the annular space is suitably supplied with water via conduits located in the operating rod of the valve, the space between the valve disc, bellows and bottom plate, and a bored channel in the valve disc.

BRIEF DESCRIPTION OF THE DRAWINGS

The invention will be described in greater detail with reference to the accompanying drawings in which:

FIG. 2 shows a longitudinal section through the upper portion of a condenser having a cut-off valve.

FIG. 3 shows a cross-section of the same condenser showing a section through the valve member.

FIG. 4 shows on a larger scale a detail of the valve member and the valve seat.

BEST MODE FOR CARRYING OUT THE INVENTION

Figure 1:
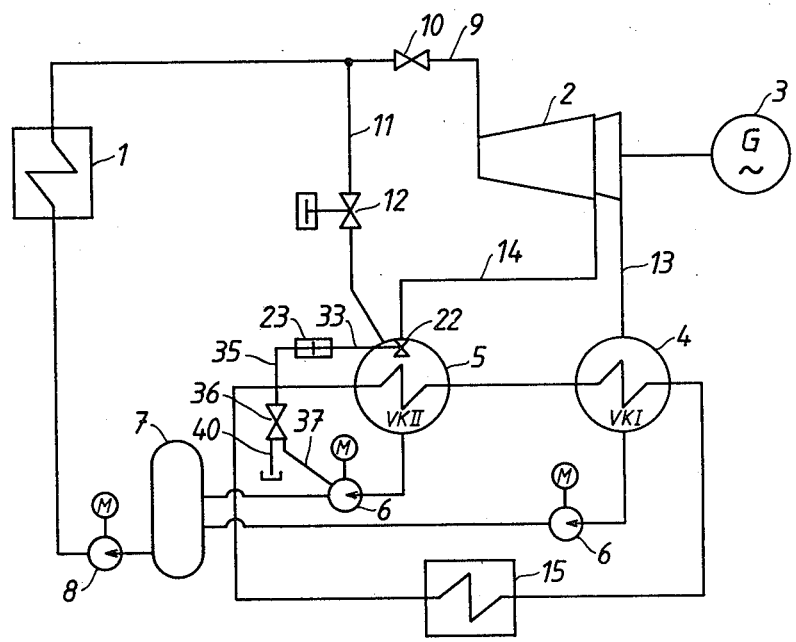
FIG. 1 shows a diagram of a combined power and heating plant for a district heating plant.

FIG. 1 shows a turbine generator system comprising a steam boiler 1; a back pressure turbine 2 driving a generator 3; a pair of condensers 4 and 5 which receive and condense the steam from the turbine 2; a pair of condensate pumps 6 which pump condensate to a container 7; and a feed water pump 8. Boiler 1 is connected to turbine 2 by a conduit 9 with a valve 10; and to the condenser 5, by a parallel conduit 11 with a valve 12. Turbine 2 is connected to condensers 4 and 5 by parallel conduits 13 and 14. Condensers 4 and 5 are heaters for hot water in a district heating system or other separate heating system, symbolized by a heat exchanger 15.

Connecting pipe 14 between turbine 2 and condenser 5 opens into the upper part of the condenser, as shown in FIGS. 2 to 4. The opening is surrounded by a ring 20 which forms a valve seat. The upper part of condenser 5 is provided with two longitudinal L-shaped guides 21 along which a valve member 22 may be displaced between the position shown in FIG. 2 immediately below connecting pipe 14 and a position to the right thereof. Valve member 22 may be displaced between these two positions by an operating cylinder 23 located outside condenser 5.

Valve member 22 comprises a valve disc 24 having stiffeners 25 on its lower side, a bottom plate 26 having stiffeners 27, and a bellows 28 connecting valve disc 24 and bottom plate 26. Stiffeners 25 limit the downward movement of valve disc 24. Valve seat 20 is formed with a downwardly extending circumferential flange 29 and radially inwardly from flange 29, with a slot 30 for a sealing ring 31. Between valve seat 20, sealing ring 31 and valve disc 24, there is formed an annular space 32 for sealing water.

The operating cylinder 23 has a piston rod 33 which extends through the wall of condenser 5. Through a channel 34 in piston rod 33, a hose 35, a valve 36 and a conduit 37, an interior space 38 defined within valve member 22 may be supplied with pressurized water from condensate pump 6. Annular space 32 communicates with space 38 through a bore or channel 39 provided through valve disc 24. The conduit 40 is a drain conduit. The operating cylinder 23 communicates with a pressure medium source through conduits and valves (not shown).

If turbine 2 for some reason is to be shut off and steam from boiler 1 is to be supplied directly to condenser 5 through conduit 11 and valve 12, then valve member 22 is displaced along the guides 21 by the operating cylinder 23, to the position shown in FIG. 2. When valve member 22 has been brought to this position, space 38 is connected to the high pressure side of one of condensate pumps 6, via conduit 37, valve 36, hose 35 and channel 34 in piston rod 33. The pressurized water thus provided lifts valve disc 24 and presses it against valve seat 20. Through channel 39 in the valve disc 24, annular space 32 between the sealing surfaces of the valve seat and the valve disc is supplied with sealing water from space 38. When turbine 2 is to be placed in operation again, space 38 is drained by adjusting the valve 36 such that water is able to flow from space 38 via channel 34 in piston rod 33, hose 35, valve 36 and conduit 40 into a collecting container, not shown. When valve disc 24 has separated from valve seat 20 by its own weight, valve member 22 is moved to the side so that the opening is uncovered from connecting pipe 14 into condenser 5.

Having described my invention in sufficient detail to enable those skilled in the art to make and use it, I claim:

1. An improved turbine and heating plant apparatus, comprising:

a boiler for producing steam;

a turbine arranged to be driven by said steam;

at least one condenser having a steam inlet opening for receiving steam from said turbine, said condenser being adapted for heating water for a separate heating system; and valve means arranged inside said condenser for closing said steam inlet opening.

2. Apparatus according to claim 1, wherein said valve means comprises a valve seat surrounding said steam inlet opening and a valve member adapted to cooperate with said valve seat.

3. Apparatus according to claim 2, further comprising means arranged inside said condenser for guiding said valve member between a first position at one side of said steam inlet opening and a second position covering said steam inlet opening.

4. Apparatus according to claim 3, wherein said valve member comprises a valve disc, said valve means further comprising means for pressing said valve disc against said valve seat.

5. Apparatus according to claim 4, wherein said pressing means comprises a bottom plate; a bellows extending between said bottom plate and said valve disc whereby an interior space is defined between said valve disc, bellows and bottom plate; and means for fluid pressurizing said interior space.

6. Apparatus according to claim 5, further comprising an annular space defined between said valve seat and said valve disc and means for fluid pressurizing said annular space when said valve means is closed.

7. Apparatus according to claim 6, wherein said guiding means comprises an operating rod attached to said valve means, said operating rod comprising fluid conduits for supplying fluid to said interior space and said annular space.

8. Apparatus according to claim 7, further comprising a fluid flow channel between said interior space and said annular space.

* * * * *